US010513304B2

(12) United States Patent
Thomson

(10) Patent No.: US 10,513,304 B2
(45) Date of Patent: Dec. 24, 2019

(54) CONFIGURABLE CYCLE VEHICLE AND METHOD OF CONVERSION OF A CYCLE VEHICLE BETWEEN FIRST AND SECOND RIDING CONDITIONS

(71) Applicant: INTUITIVE DESIGNS (JERSEY) LTD, St Peter (JE)

(72) Inventor: Wendy Thomson, St Peter (JE)

(73) Assignee: Intuitive Designs (Jersey) Ltd, St. Peter (JE)

( * ) Notice: Subject to any disclaimer, the term of this patent is extended or adjusted under 35 U.S.C. 154(b) by 0 days.

(21) Appl. No.: 15/751,621

(22) PCT Filed: Aug. 23, 2016

(86) PCT No.: PCT/GB2016/052615
§ 371 (c)(1),
(2) Date: Feb. 9, 2018

(87) PCT Pub. No.: WO2017/032999
PCT Pub. Date: Mar. 2, 2017

(65) Prior Publication Data
US 2018/0229795 A1 Aug. 16, 2018

(30) Foreign Application Priority Data
Aug. 26, 2015 (GB) .................... 1515175.6

(51) Int. Cl.
*B62K 5/06* (2006.01)
*B62M 17/00* (2006.01)
(Continued)

(52) U.S. Cl.
CPC ............. *B62K 5/06* (2013.01); *B62K 3/005* (2013.01); *B62K 3/02* (2013.01); *B62K 5/027* (2013.01);
(Continued)

(58) Field of Classification Search
CPC . B62K 5/06; B62K 3/005; B62K 3/02; B62K 13/08; B62M 1/36
See application file for complete search history.

(56) References Cited

U.S. PATENT DOCUMENTS 5,419,574 A * 5/1995 Krumm ................. B62K 3/005
280/278
2008/0116665 A1* 5/2008 Nakaizumi ............ B62D 21/14
280/638
2012/0012413 A1 1/2012 Tsai et al.

FOREIGN PATENT DOCUMENTS

CN 101 670 865 A 3/2010
CN 202046405 U 11/2011
(Continued)

OTHER PUBLICATIONS

British Search Report—GB1515175.6 dated Feb. 25, 2016.
(Continued)

*Primary Examiner* — Anne Marie M Boehler
*Assistant Examiner* — Michael R Stabley
(74) *Attorney, Agent, or Firm* — Millman IP Inc.

(57) ABSTRACT

A configurable cycle vehicle (10) has an adjustable frame (12) which is formed from a plurality of relatively configurable frame members (26, 28, 30, 32, 34), and which can be separately arranged in a first, upright riding condition, or alternatively in a second, recumbent riding condition. A method of conversion of a cycle vehicle between first and second riding conditions is also provided.

18 Claims, 4 Drawing Sheets

(51) Int. Cl.
  *B62K 3/00*    (2006.01)
  *B62K 13/08*   (2006.01)
  *B62M 6/60*    (2010.01)
  *B62M 1/36*    (2013.01)
  *B62K 5/027*   (2013.01)
  *B62M 5/00*    (2006.01)
  *B62K 3/02*    (2006.01)

(52) U.S. Cl.
  CPC ............... *B62K 13/08* (2013.01); *B62M 1/36* (2013.01); *B62M 5/00* (2013.01); *B62M 6/60* (2013.01); *B62M 17/00* (2013.01)

(56) References Cited

FOREIGN PATENT DOCUMENTS

| CN | 203511915 U | 4/2014 |
|----|----|----|
| DE | 10 2004 008982 A1 | 9/2005 |
| DE | 102004020376 A1 | 10/2005 |
| DE | 20 2008 009909 U1 | 10/2008 |
| DE | 202014000137 U1 | 3/2014 |
| KR | 2012 0010613 A | 2/2012 |
| WO | 2005/047093 A1 | 5/2015 |

OTHER PUBLICATIONS

International Search Report and Written Opinion of the International Searching Authority—PCT/GB2016/052615 dated Nov. 10, 2016.
Examination Report for EP application No. 16763071.4 dated Feb. 20, 2019.
Notification of the First Office Action of Chinese application No. 201680049233.8 dated Jun. 25, 2019.
English translation of the Notification of the First Office Action of Chinese application No. 201680049233.8 dated Jun. 25, 2019.
Second European Examination Report for EP Application No. 16 763 071.4 dated Sep. 4, 2019.

* cited by examiner

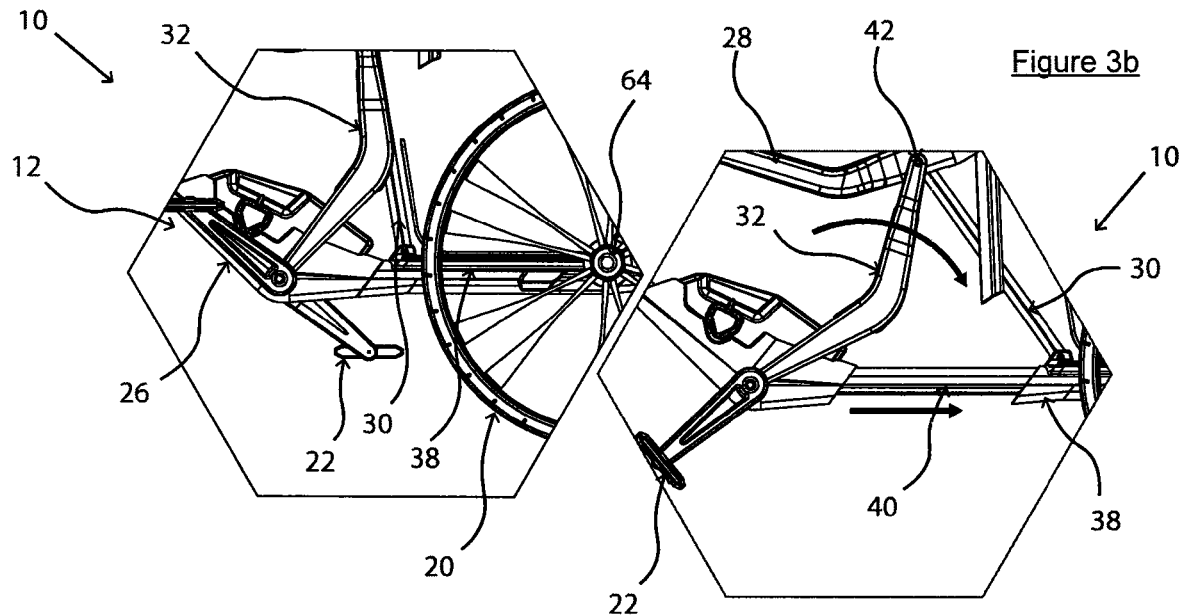
Figure 3a
Figure 3b
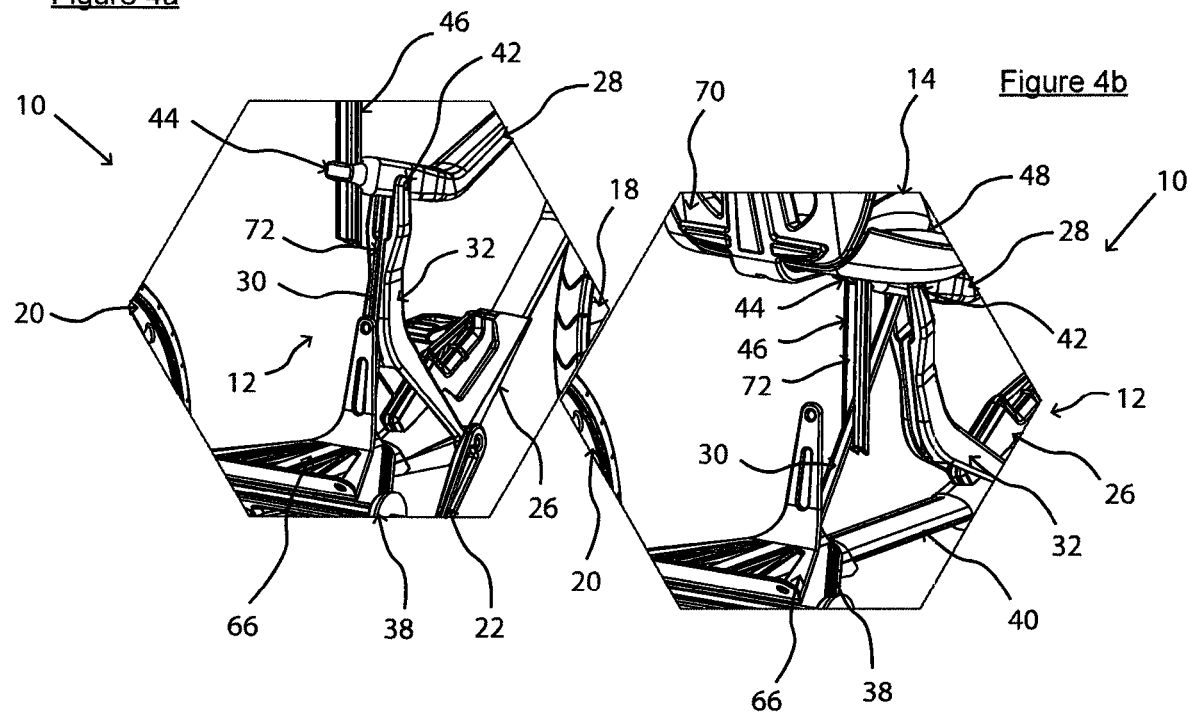
Figure 4a
Figure 4b

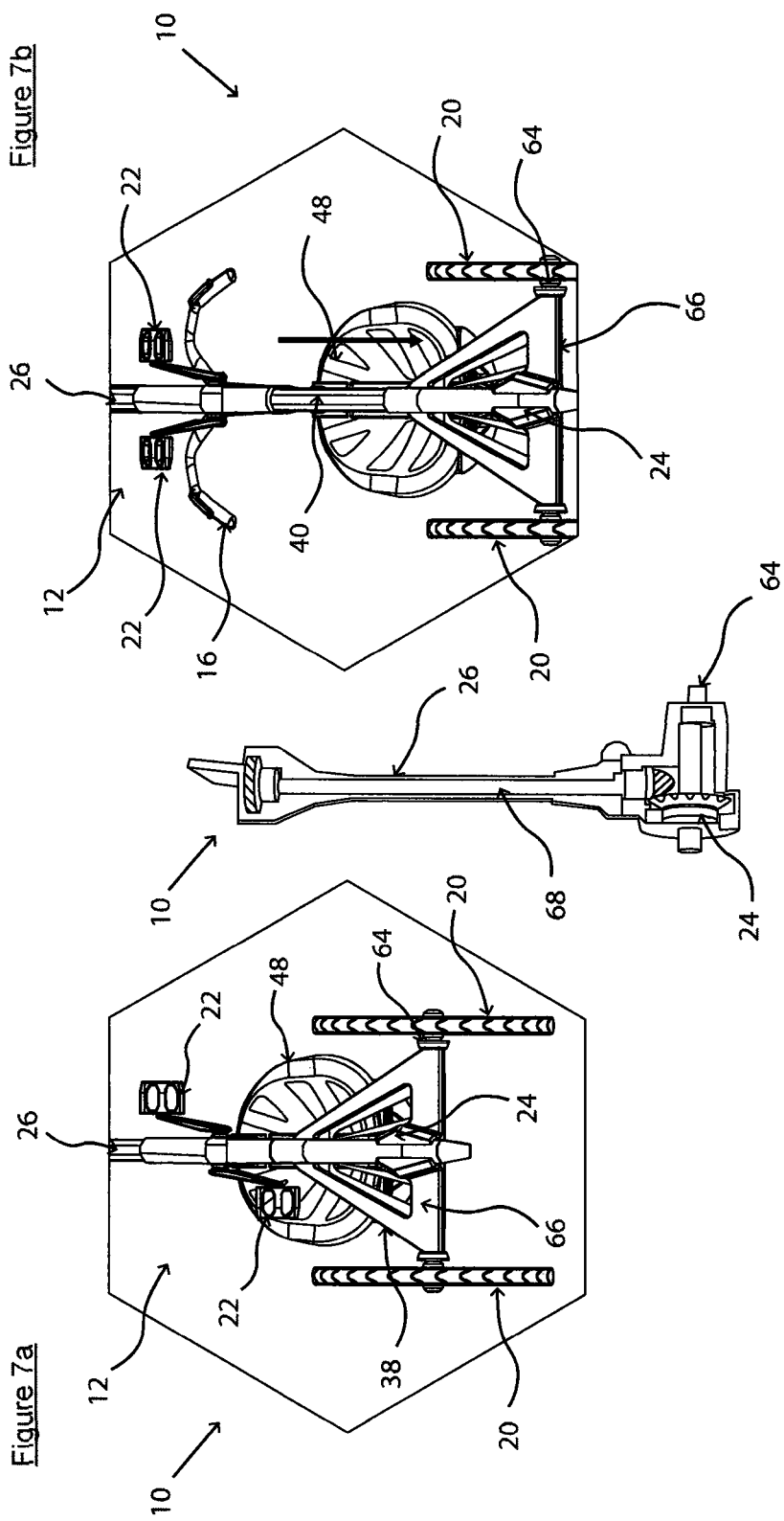

CONFIGURABLE CYCLE VEHICLE AND METHOD OF CONVERSION OF A CYCLE VEHICLE BETWEEN FIRST AND SECOND RIDING CONDITIONS

The present invention relates to a configurable cycle vehicle, preferably a tricycle or a bicycle and preferably one which is human powered, which provides a plurality of different riding experiences for a rider. A method of converting a cycle vehicle between first and second riding conditions is also provided.

Many people use cycle vehicles, such as bicycles, tricycles, rickshaws and tandems, for both travel and pleasure. These vehicles are provided having a wide variety of different riding positions, dependent upon a user's needs and desires.

A traditional bicycle, for instance, has a saddle which is positioned away from the handlebars, which are slightly elevated relative to the saddle, such that the user is in a generally upright position whilst cycling. The legs of the user will then be generally vertical when engaged with the pedals in their lowermost position, with the knee rising and bending as the pedals are rotated by the user's feet. This allows for a relatively casual and comfortable ride, with the user's head being elevated for a good view of the surrounding area.

On the other hand, for a racing bicycle, the user will generally adopt a more hunched position over the handlebars. In this arrangement, the saddle will be level with, or elevated with respect to the handlebars, facilitating this hunched condition so as to minimise wind resistance when riding, and allowing the rider to achieve a greater velocity.

Alternatively, the saddle can be replaced with a seat having a back and/or sides, akin to a chair, with the seat being relatively rearward on the frame of the cycle vehicle, and lower than for a standard bicycle. The handlebars can then be angled from the vertical with respect to the front wheels, or even positioned to the sides of the user, so as to allow the user to adopt a recumbent or near-recumbent position. This may be more comfortable to the user, providing greater back and neck support; however, the riding position is very low, which may mean that the user is positioned directly in the path of exhaust fumes from other road vehicles. Given the lower centre of gravity, such cycle vehicles are often formed as tricycles for stability.

There are therefore advantages and disadvantages with each style of cycle vehicle, and if a user wishes to have a different riding experience, then they must obtain different cycle vehicles for each purpose.

It is therefore an object of the present invention to provide a configurable cycle vehicle which can be configured between two riding condition for distinct riding experiences.

According to a first aspect of the invention, there is provided a configurable cycle vehicle comprising: an adjustable frame; at least two wheels engaged with the frame; a seat element engaged with the frame; handlebars engaged with the frame; and a propulsion means for providing motive force to the wheels; the adjustable frame including at least a supporting frame member and a crossbar which are adjustably repositionable relative to one another to provide first and second different riding conditions, the second riding condition being recumbent relative to the first riding condition.

By providing multiple riding conditions for a user, different riding experiences can be provided, allowing the user to use a single cycle vehicle for a variety of different purposes. Where a standard upright riding condition is utilised, the user can cycle as normal, potentially using the cycle vehicle primarily for transportation or commuting. On the other hand, by changing the frame of the cycle vehicle such that the seat and handlebars present a more recumbent position for the user, a more relaxed riding experience can advantageously be provided.

Preferably, the propulsion means may include pedals configured to provide drive to at least one of the wheels. The propulsion means may additionally or alternatively include an electric motor. Where pedals and an electric motor are both provided, there may further comprise a drive shaft which couples the pedals to the wheels, the drive shaft being engagable in the first riding condition and disengagable in the second riding condition, the electric motor providing the motive force in the second riding condition.

Multiple different propulsion mechanisms could be provided for a configurable cycle vehicle; standard pedal control is typical for a cycle vehicle, using a chain linkage to provide thrust or torque to the rear wheels. Electrically powered vehicles are also known. It may also advantageously possible to provide a mechanism by which the cycle vehicle can be manually operated in the first riding condition, and then automatically powered in the second riding condition to provide a comfortable and relaxing riding experience.

Optionally, there may further comprise a regenerative energy generation means for recharging a battery of the electric motor as the pedals are rotated.

Regenerative energy generation using the pedalling of the rider makes for a synergistic combination between the first riding condition, in which the cycle vehicle is typically manually powered, and the second riding condition, wherein the electric motor provides the necessary thrust, the manual drive from the first condition creating charge for the battery of the electric motor.

Preferably, the crossbar may be pivotably engagable with the supporting frame member, and furthermore a pivotable connection frame member may be provided between the supporting frame member and the crossbar to effect pivotable engagement therebetween. Additionally, a guiding linkage may be provided which is connected to the supporting frame member and crossbar to guide the pivoting engagement of the connection frame member.

The general construction of the frame is similar to that of a standard bicycle, but the provision of an extra guiding linkage advantageously provides a set trajectory for the frame members to move relative to one another, ensuring that the user can only move the frame members to their correct positions for each of the first and second riding conditions. This beneficially simplifies the transition between the first and second riding conditions for a user.

Preferably, all relative movements of adjustable frame when converting between the first and second conditions may occur synchronously.

A synchronous relative movement of each of the plurality of frame elements of the frame ensures that the user cannot accidently configure the frame of the cycle vehicle in an incorrect, unusable condition. The restricted and fluid motion of the frame elements between the first and second conditions can therefore be operated smoothly by a user.

The adjustable frame may include at least one moveable frame member which is moveable relative to the supporting frame member and/or crossbar. One said moveable frame member may be provided as a handlebar frame member, the handlebar frame member being engaged with the handlebars and one of the wheels, the handlebar frame member being pivotable at or adjacent to the said wheel relative to the supporting frame member. Furthermore, in the second riding condition, the handlebar frame member may be pivoted to a greater angle from the vertical than in the first riding condition.

The frame members are relatively moveable with respect to one another, and particularly being pivotable, generally corresponding to the standard frame bars of a bicycle. The handlebar frame member is moveable by a change in the angle relative to the front wheel of the cycle vehicle, helping to achieve the necessary change from the first to the second riding conditions.

The seat element may be engaged with the crossbar so as to be moveable relative to the supporting frame member.

The relative movement of the seat element with respect to the rest of the frame allows for the cycle vehicle to be customised to the size of the rider in either of the first and second conditions as desired.

In a preferred embodiment, at least part of the adjustable frame may be telescopically extendible or retractable. Extension or retraction of the telescopically extendible or retractable frame may effect the conversion between the first and second riding conditions.

The telescopic extension of frame members allows for the entire wheelbase of the cycle vehicle to be expanded, allowing the greater required length of the second, recumbent condition to be accommodated. Furthermore, it may provide a means of engaging or disengaging a drive shaft associated with a manual propulsion means.

There may further be provided a locking means to lock the configuration of the cycle vehicle into one or other of the first or second riding conditions.

A locking means beneficially allows the first and second riding conditions to be effectively secured, ensuring that there is no slippage or displacement between the two conditions in use, which could otherwise potentially be dangerous to the rider.

In the second riding condition, the seat element may be lower than in the first riding condition.

A recumbent position could feasibly just be further towards the rear of the cycle vehicle than normal; however, it will typically be lower, seated position for the rider in the seat. This is generally more comfortable for the rider than the standard upright position.

A vertical position and/or a horizontal position of the seat element relative to the handlebars may be adjustable.

Alteration of the relative positions of the seat element and handlebars advantageously allows a single cycle vehicle to be utilised by a plurality of riders of different shapes and/or sizes.

Optionally, there may also comprise a slotted runner at or adjacent to the seat element to prevent collision of the seat element with the adjustable frame during conversion of the adjustable cycle vehicle between the first and second riding conditions.

The provision of a slotted runner in the seat tube simplifies the adjustment of the cycle vehicle between the first and second riding conditions, ensuring that there is no collision between the seat tube and the various moving parts during reconfiguration.

In preferred embodiments, the configurable cycle vehicle may be a tricycle or a bicycle.

According to a second aspect of the invention, there is provided a method of conversion of a cycle vehicle between first and second riding conditions, the method comprising the steps of providing a configurable cycle vehicle as claimed in any one of the preceding claims in one of the said first or second riding condition; and configuring the adjustable frame such that at least the seat element and handlebars are positioned in a more or less recumbent position in the other of the said first or second riding condition.

At least part of the adjustable frame may be telescopically extendible and/or retractable between the first and second riding conditions. Additionally or alternatively, wherein the adjustable frame includes a handlebar frame member, and wherein an angle of the handlebar frame member relative to at least one of the wheels is different between the first and second riding conditions.

The invention will now be more particularly described, by way of example only, with reference to the accompanying drawings, in which:

FIGS. 3a and 3b show partial enlarged side views of a central linkage of the configurable cycle vehicle of FIG. 1 in the first and second conditions respectively;

FIGS. 4a and 4b show partial enlarged rear perspective views of the central linkages shown in FIGS. 3a and 3b respectively;

FIGS. 7a and 7b show a partial bottom plan view of the central portion of the configurable cycle vehicle shown in FIG. 1 in the first and second conditions respectively; and FIG. 7c shows a cross-sectional plan view through the frame of the central portion of the configurable cycle vehicle shown in FIG. 7a, illustrating a drive shaft of the configurable cycle vehicle.

Figure 1:
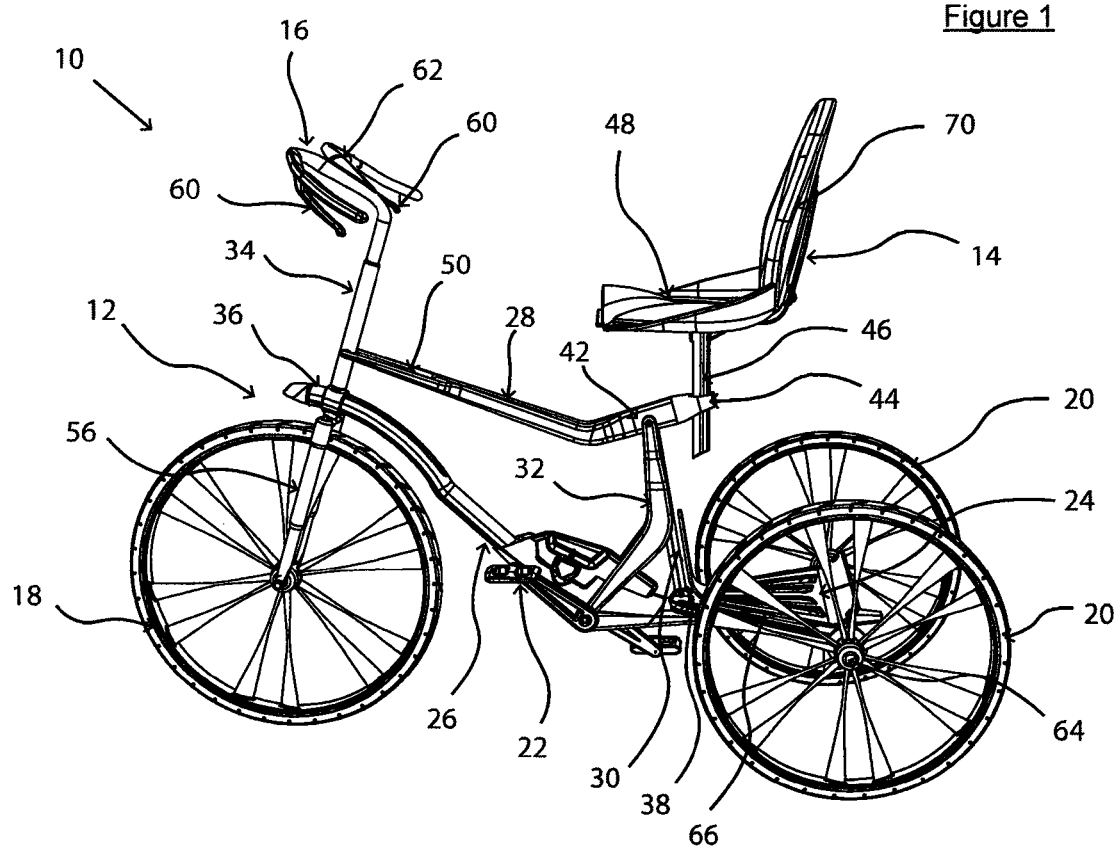
FIG. 1 shows a side view of one embodiment of a configurable cycle vehicle in accordance with the first aspect of the invention, in a first, upright riding condition.
Figure 2:
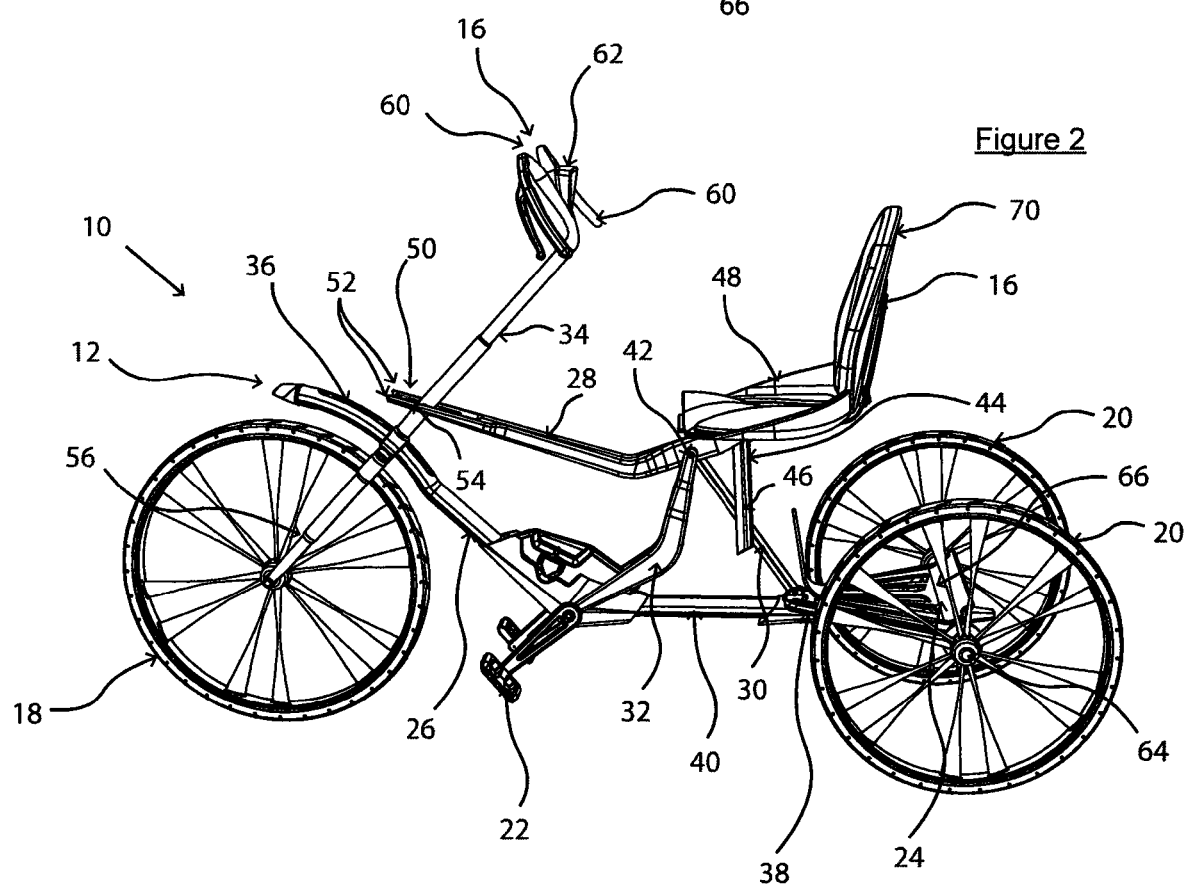
FIG. 2 shows a side view of the configurable cycle vehicle of FIG. 1, converted into a second, recumbent condition.

Referring firstly to FIGS. 1 and 2, there is shown a configurable cycle vehicle, illustrated here as a tricycle and referenced globally as 10. The present invention could be utilised with any type of human powered and/or electric powered cycle vehicle, including but not limited to bicycles, tricycles, quadricycles, rickshaws, tandems or motorised cycles. The configurable cycle vehicle is designed to provide the user with a variable riding experience depending upon the configuration of the cycle vehicle, and the mechanism by which the motive force is generated and/or applied could be provided in many different ways.

The tricycle 10 shown comprises an adjustable frame 12 which is formed from a plurality of relatively moveable frame members, a seat element 14 attached to the frame 12, handlebars 16 also attached to the frame 12, one front wheel 18 and two rear wheels 20, and a propulsion means or mechanism, which here includes a set of pedals 22 and an electric motor 24, respectively positioned at the centre and rear of the tricycle 10 in the present embodiment, though one or other of these could be dispensed with. For the avoidance of doubt, the adjustability of the frame 12 refers to adjustment beyond the standard vertical adjustability normally associated with seat or handlebar height of a bicycle.

The frame members include a supporting frame member 26, which might be considered to be the equivalent of the down tube of a traditional bicycle frame, a crossbar 28 which is in pivotable engagement with the supporting frame member 26 via a connection frame member 30 which respectively correspond to the top tube and seat tube of a traditional bicycle frame. Also connecting the supporting frame member 26 and crossbar 28, adjacent to the connection frame member 30, is provided a guiding linkage 32. There is also provided a handlebar frame member 34 which is engaged with both the supporting frame member 26 and the crossbar 28 spaced apart from the connection frame member 30.

The supporting frame member 26 is preferably formed as an elongate tube, as illustrated, which is bent at a central point. The pedals 22 are then preferably mounted to the supporting frame member 26. An elongate slot 36 is formed in the tube extending in a forwards direction from the central point, with a rear wheel axle mount 38 extending rearwardly therefrom.

The guiding linkage 32 is pivotably connected to the supporting frame member 26 at or adjacent to the pedals 22, whilst the connection frame member 30 is connected adjacent to the rear wheel axle mount 38, thereby forming a parallelogram or parallelogram-like linkage. Between these points of connection, there is a telescopically extendible and retractable portion 40 of the supporting frame member 26, as seen in FIG. 2, allowing the connection frame member 30 to be extended and retracted relative to the guiding linkage 32. Whilst the parallelogram-type linkage illustrated may be the preferred arrangement of the invention, it will be appreciated that the extension and retraction of the connection frame member 30 is the more important feature, and the supporting frame member 26 need not necessarily be telescopic; a sliding joint could be provided, with the connection frame member 30 being keyed to the supporting frame member 26 instead, for example.

To continue the analogy with a standard bicycle, the forward end of the supporting frame member 26, crossbar 28 and guiding linkage 32 here form what might be considered to be the front triangle of the tricycle 10, even though the actual shape is not triangular. The guiding linkage 32, connection frame member 30 and rearward end of the supporting frame member 26 can be considered to form what would otherwise be the rear triangle.

The crossbar 28 is also preferably formed as an elongate tube, also preferably including a bend or kink towards its middle. In this embodiment, the guiding linkage 32 and connection frame member 30 are pivotably connected to the crossbar 28 at a single pivot point 42 so as to pivot in tandem; other linkage arrangements could feasibly be considered.

The connection frame member 30 is preferably provided as a straight tube interconnecting the supporting frame member 26 and the crossbar 28, whereas the guiding linkage 32 is preferably kinked. This arrangement allows for the necessary range of motion to effect the change between the first and second conditions of the cycle vehicle 10; however, it will be appreciated that this is only one solution to arrive at the desired mechanism, and other shapes of connection frame member 30 and guiding linkage 32 are equally plausible.

At a rearmost end of the crossbar 28 is provided a bracket 44, via which can be attached the seat element 14, preferably via an adjustable seat tube 46 attached to the bottom of a squab 48 or saddle of the seat element 14. At the opposing forwardmost end of the crossbar 28 is provided a fork 50 having two tines 52, each having a groove 54 running along an inwardly-facing surface thereof; this fork 50 enables coupling to the handlebar frame member 34.

The handlebar frame member 34 is formed preferably as an elongate tube which at an uppermost end extends into the handlebars 16 and at the opposing lowermost end extends into a wheel fork 56 to which the front wheel 18 is attachable. This permits a user to steer the tricycle 10 via the handlebar frame member 34.

Figure 6A:
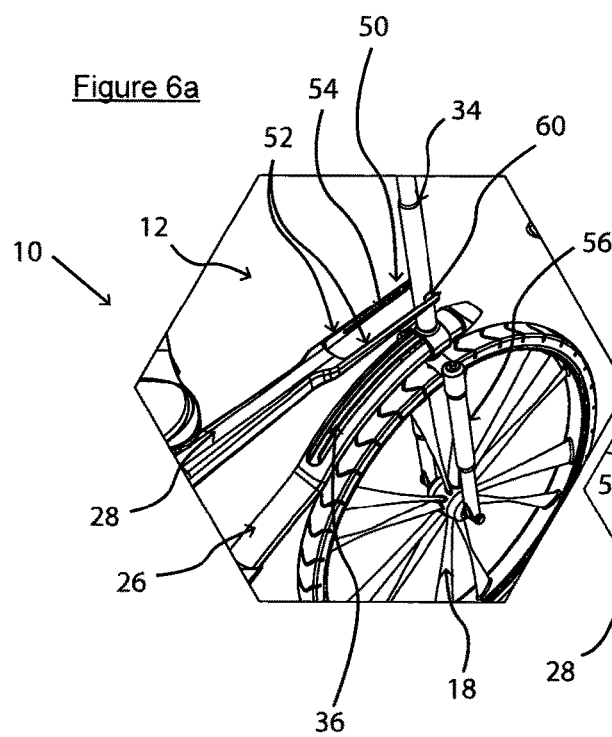
FIGS. 6a and 6b show partial rear perspective views of the front-end linkages shown in FIGS. 5a and 5b respectively.
Figure 6B:
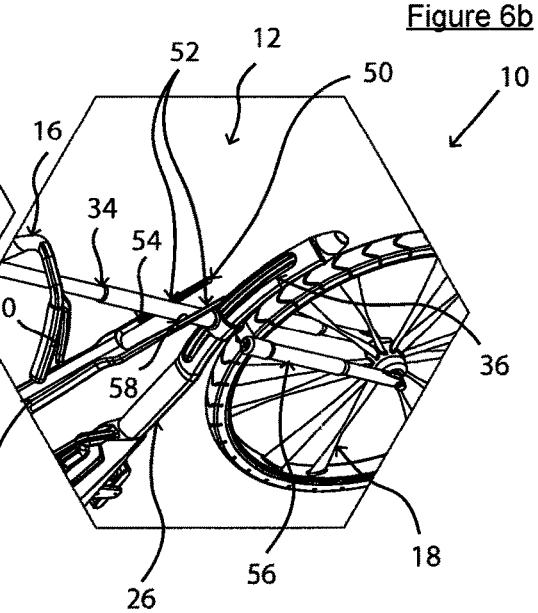

At or adjacent to a mid-point of the tube of the handlebar frame member 34 is provided two opposed spigots 58, seen best in FIGS. 6a and 6b, which are able to couple with the grooves 54 of the fork 50 of the crossbar 28, preferably in sliding engagement.

The handlebars 16 as shown are formed as traditional cowhorn-style bars, and include the brakes 60 for the tricycle 10. Many different varieties of handlebars are available, however. Additional functionality may be included associated with the handlebars 16, for instance, a control mechanism 62 for the electric motor 24.

At the rear of the tricycle 10, mounted to the rear wheel axle mount 38 of the supporting frame member 26 is provided an axle 64 which couples together the two rear wheels 20. As illustrated, there may also be provided a luggage rack 66 which spans the rear wheel axle mount 38, to thereby allow a rider to stow their possessions whilst in transit.

Also installed at the rear of the tricycle 10, and coupled with the rear wheel axle 64 is provided the electric motor 24, if required, allowing the electric motor 24 to directly drive the rear wheels 20 via the rear wheel axle 64. The rear wheel axle 64 is also coupled, via a drive shaft 68 to the pedals 22, shown in FIG. 7c, thereby allowing a user to pedal the tricycle 10 manually.

The seat element 14 is mounted to the crossbar 28 and may be formed having a squab 48 and backrest 70 so as to provide the user with adequate back support, particularly in the recumbent position. The seat element 14 as shown has a pivotable backrest 70 which can be readily stowed into the squab 48, allowing for simple conversion of the seat element 14 into a typical saddle.

The seat tube 46, which is connected to the seat element 14, can be vertically adjusted within the bracket 44. To avoid collision with the frame 12 in use, the seat tube 46 is preferably provided having a slotted runner 72 formed therein, to allow obstructive frame members to pass through the seat tube 46. Furthermore, the seat element 14 may also be horizontally adjustable relative to the handlebars 16, by providing, for instance, an actuatable mounting plate for the seat element 14.

If a user wishes to ride the tricycle 10 in a standard, upright condition, hereafter referred to as the first condition, then they are able to do so by retracting the telescopic portion 40 of the supporting frame member 26 fully so that the rear wheel axle mount 38 is in as forwardmost a position as possible. This will draw the connection frame member 30 so as to be positioned in close proximity with the guiding linkage 32, such that the connection frame member 30 is vertical or substantially so, as illustrated in FIG. 3a in particular. This forces the crossbar 28 upwards, bringing the seat element 14 into its highest condition, as shown in FIG. 4a.

Figure 5A:
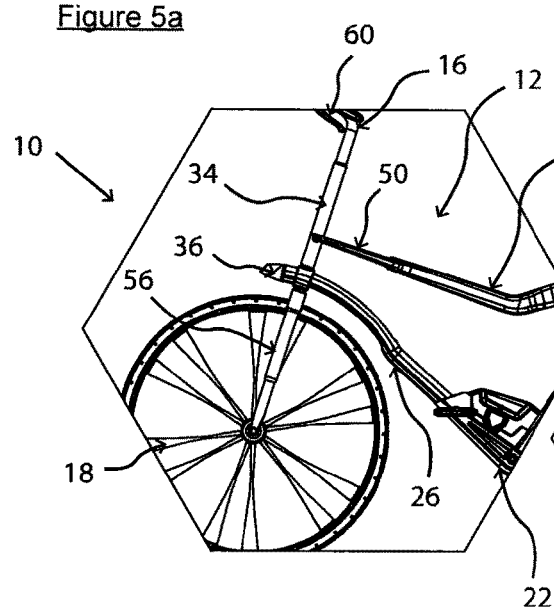
FIGS. 5a and 5b show partial side views of a front-end linkage of the configurable cycle vehicle of FIG. 1 in the first and second conditions respectively.

This motion of the crossbar 28 urges the handlebar frame member 34 into a condition which is vertical or substantially so, as can be seen in FIG. 5a, with the handlebars 16 themselves being substantially over the front wheel 18. This is achieved by allowing the handlebar frame element 34 to slide through the slot 36 in the supporting frame member 26, being urged towards the front of the tricycle 10 as much as possible. This is shown in FIGS. 5a and 6a.

In this first configuration, the drive shaft 68 can be in engagement with the pedals 22, and therefore a rider can sit on the seat element 14 and pedal to produce the necessary motive force to ride the tricycle 10. This arrangement can be seen in FIG. 7*a*. The rider could, of course, alternatively engage the electric motor 24, if desired, to reduce the difficulty of riding. This allows the rider to cycle along from an elevated position, providing them with an optimal view of the surrounding area.

However, if the rider wishes to ride in a more recumbent configuration, hereafter referred to as the second condition, then they can adjust the supporting frame member 26 such that the telescopic portion 40 is extended. As shown in FIG. 3*b*, this draws the connection frame member 30 away from the pedals 22 in the direction of the rear wheels 20. This also causes the guiding linkage 32 to rotate about the pivot on the supporting frame member 26, which in turn pulls down the rear end of the crossbar 28.

The lowering of the crossbar 28 also causes the seat element 14 to be lowered, and, as can be seen in FIG. 4*b*, would ordinarily cause the seat tube 46 to collide with the connection frame member 30, were it not for the provision of the slotted runner 72, which accepts the connection frame member 30 therein.

Figure 5B:
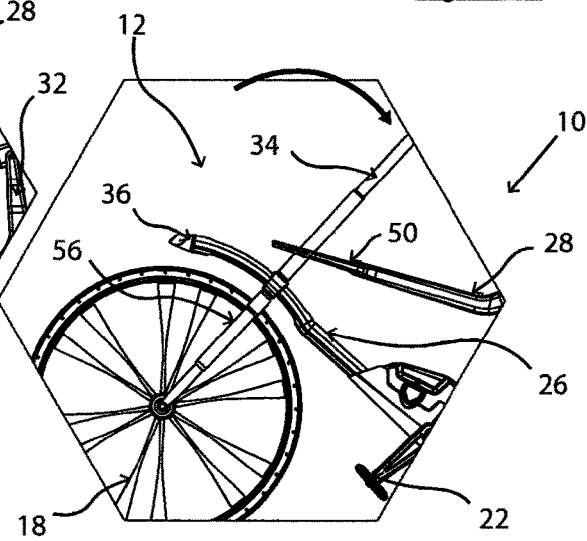

The lowering of the whole crossbar 28 also forces the handlebar frame member 34 to rotate about the wheel fork 56 at the front wheel 18, with the connection between the spigots 58 and the tines 52 of the fork 50 of the crossbar 28 forcing the upper portion of the handlebar frame member 34 downwards. This manifests as a rotation of the handlebar frame member 34 so as to be angled substantially away from the vertical, as illustrated in FIG. 5*b*, this is approximately 45 degrees. As can be seen from FIG. 6*b*, the handlebar frame member 34 thereby slides relative to the supporting frame member 26 through the elongate slot 36.

This second condition therefore results in a relatively low seating position for the rider, as the seat element 14 is substantially lowered, and the handlebars 16 are rotated into position, preferably in one synchronous motion, so as to be in the correct position for riding the tricycle 10. It will be appreciated that this lower seating position is more recumbent than that of the first, upright riding condition, even if this is not necessarily as reclined as in a traditional recumbent bicycle.

Additionally, the extension of the telescopic portion 40 of the supporting frame member 26 can be arranged so as to cause dislocation of the drive shaft 68 of the tricycle 10, disengaging control of the tricycle 10 via the pedals 22 and ensuring that, in the second condition, the motive force of the tricycle 10 is provided solely by the electric motor 24. This can be seen in FIG. 7*b*. In such a scenario, it may be possible and/or desirable to reconfigure the pedals 22 into footrests, locking into position.

Ideally, the adjustment of the frame members of the frame 12 should be relatively adjustable to one another so as to configure synchronously, in order to make reconfiguration of the tricycle 10 straightforward for the rider. It will be appreciated, however, that the reconfiguration of the frame 12 can be performed sequentially.

The pedals 22 may also be linked to a battery of the electric motor 24, such that, when the user pedals the tricycle, typically in the first condition, then the pedalling may also generate sufficient electrical power to regeneratively charge of the battery, by providing a regenerative energy generation means or mechanism. In a similar manner, regenerative braking could also be applied to recharge any onboard battery.

It may be possible to provide a dedicated locking means or mechanism which locks the configurable cycle vehicle in one or other of the first or second conditions, such as a latch, ratchet, both or keyed system.

It is therefore possible to provide a configurable cycle vehicle which has an adjustable frame which is formed from a plurality of relatively configurable frame members, and which can be separately arranged in a first, upright riding condition, or alternatively in a second, recumbent riding condition.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention herein described and defined.

The invention claimed is:

1. A configurable cycle vehicle comprising:
   an adjustable frame;
   at least two wheels engaged with the frame;
   a seat element engaged with the frame;
   handlebars engaged with the frame;
   a propulsion mechanism for providing motive force to the wheels, the propulsion mechanism having pedals configured to provide drive to at least one of the wheels;
   a drive shaft which couples the pedals to the wheels; and
   an electric motor; wherein
   the adjustable frame includes at least a supporting frame member and a crossbar which are adapted to adjustably reposition to one another to provide first and second different riding conditions, the second riding condition being recumbent relative to the first riding condition, and
   the drive shaft is adapted to engage in the first riding condition and disengage in the second riding condition, the electric motor providing the motive force in the second riding condition.

2. A configurable cycle vehicle as claimed in claim 1, further comprising a regenerative energy generator to recharge a battery of the electric motor as the pedals are rotated.

3. A configurable cycle vehicle as claimed in claim 1, wherein the crossbar is adapted to pivotably engage with the supporting frame member.

4. A configurable cycle vehicle as claimed in claim 3, further comprising a pivotable connection frame member between the supporting frame member and the crossbar to effect pivotable engagement therebetween.

5. A configurable cycle vehicle as claimed in claim 3, further comprising a guiding linkage connected to the supporting frame member and crossbar to guide the pivoting engagement of the connection frame member.

6. A configurable cycle vehicle as claimed in claim 1, wherein all relative movements of the adjustable frame when converting between the first and second conditions occur synchronously.

7. A configurable cycle vehicle as claimed in claim 1, wherein the adjustable frame includes at least one moveable frame member which is adapted to move relative to at least one of the supporting frame member and the crossbar.

8. A configurable cycle vehicle as claimed in claim 7, wherein one said moveable frame member is provided as a handlebar frame member, the handlebar frame member being engaged with the handlebars and one of the wheels, the handlebar frame member being adapted to pivot at or adjacent to the said wheel relative to the supporting frame member, wherein, in the second riding condition, the handlebar frame member is pivoted to a greater angle from the vertical than in the first riding condition and/or the seat element is lower than in the first riding condition.

9. A configurable cycle vehicle as claimed in claim 1, wherein the seat element is engaged with the crossbar to move relative to the supporting frame member.

10. A configurable cycle vehicle as claimed in claim 1, wherein the adjustable frame is at least in part adapted to telescopically extend or retract.

11. A configurable cycle vehicle as claimed in claim 10, wherein extension or retraction of the adjustable frame effects the conversion between the first and second riding conditions.

12. A configurable cycle vehicle as claimed in claim 1, further comprising a locking member to lock the configuration of the configurable cycle vehicle into one or other of the first or second riding conditions.

13. A configurable cycle vehicle as claimed in claim 1, wherein a horizontal position of the seat element relative to the handlebars can be adjusted.

14. A configurable cycle vehicle as claimed in claim 1, further comprising a slotted runner at or adjacent to the seat element to prevent collision of the seat element with the adjustable frame during conversion of the configurable cycle vehicle between the first and second riding conditions.

15. A configurable cycle vehicle as claimed in claim 1, wherein the configurable cycle vehicle is a tricycle or a bicycle.

16. A method of conversion of a cycle vehicle between first and second riding conditions, the method comprising the steps of providing a configurable cycle vehicle as claimed in claim 1 in one of the said first or second riding condition; and configuring the adjustable frame such that at least the seat element and handlebars are positioned in a more or less recumbent position in the other of the said first or second riding condition.

17. A method as claimed in claim 16, wherein at least part of the adjustable frame is adapted to telescopically extend and/or retract between the first and second riding conditions.

18. A method as claimed in claim 16, wherein the adjustable frame includes a handlebar frame member, and wherein an angle of the handlebar frame member relative to at least one of the wheels is different between the first and second riding conditions.

\* \* \* \* \*